United States Patent
Fan et al.

(10) Patent No.: US 9,436,407 B1
(45) Date of Patent: Sep. 6, 2016

(54) CURSOR REMIRRORING

(71) Applicant: Amazon Technologies, Inc., Reno, NV (US)

(72) Inventors: Jianhua Fan, Seattle, WA (US); Kerry Quintin Lee, Seattle, WA (US); Danny Wei, Seattle, WA (US); Tate Andrew Certain, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 235 days.

(21) Appl. No.: 13/860,343

(22) Filed: Apr. 10, 2013

(51) Int. Cl.
G06F 3/06 (2006.01)

(52) U.S. Cl.
CPC .............. *G06F 3/065* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 5,588,110 A * | 12/1996 | DeKoning et al. | 714/5.1 |
| 6,671,705 B1 * | 12/2003 | Duprey et al. | |
| 7,039,661 B1 * | 5/2006 | Ranade | 707/610 |
| 7,191,304 B1 * | 3/2007 | Cameron et al. | 711/202 |
| 7,680,994 B2 | 3/2010 | Buah et al. | |
| 7,694,177 B2 | 4/2010 | Zohar et al. | |
| 7,793,060 B2 | 9/2010 | Zohar et al. | |
| 7,797,571 B2 | 9/2010 | Zohar et al. | |
| 7,941,501 B2 | 5/2011 | McCabe et al. | |
| 7,975,173 B2 * | 7/2011 | Callaway et al. | 714/11 |
| 8,055,865 B2 | 11/2011 | Jarvis | |
| 2003/0182322 A1 * | 9/2003 | Manley et al. | 707/201 |
| 2007/0112892 A1 * | 5/2007 | Langley et al. | 707/204 |
| 2009/0043979 A1 * | 2/2009 | Jarvis | 711/162 |
| 2009/0259816 A1 * | 10/2009 | Sharma et al. | 711/162 |
| 2010/0036851 A1 * | 2/2010 | Paterson-Jones et al. | 707/10 |
| 2010/0037031 A1 * | 2/2010 | DeSantis et al. | 711/162 |

* cited by examiner

*Primary Examiner* — Midys Rojas
*Assistant Examiner* — Tasnima Matin
(74) *Attorney, Agent, or Firm* — Robert C. Kowert; Meyertons, Hood, Kivlin, Kowert & Goetzel, P.C.

(57) ABSTRACT

Methods and systems for cursor remirroring are disclosed. A mirroring process is initiated for a plurality of chunks stored by a master node. The mirroring process comprises visiting a sequence of one or more of the chunks and, for at least some of the chunks, copying chunk data or metadata to a slave node. During the initiated mirroring process, a request is received for a write operation on one of the chunks stored by the master node. If the chunk in the request has been visited in the mirroring process, the write operation is performed on the master node and on the slave node. If the chunk in the request has not been visited, the write operation is performed on the master node and postponed on the slave node until the chunk in the request has been visited in the mirroring process.

21 Claims, 11 Drawing Sheets

CURSOR REMIRRORING

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

As the technological capacity for organizations to create, track, and retain information continues to grow, a variety of different technologies for managing and storing the rising tide of information have been developed. Distributed storage systems, for example, provide clients with many different configurations of hardware and software to manage stored information. However, the increasing amounts of data that organizations must store and manage often correspondingly increase both the size and complexity of data storage and management technologies, which in turn escalate the cost of maintaining the information. New technologies seek to reduce both the complexity and storage requirements of maintaining data while simultaneously improving the efficiency of data storage and data management.

Figure 1:
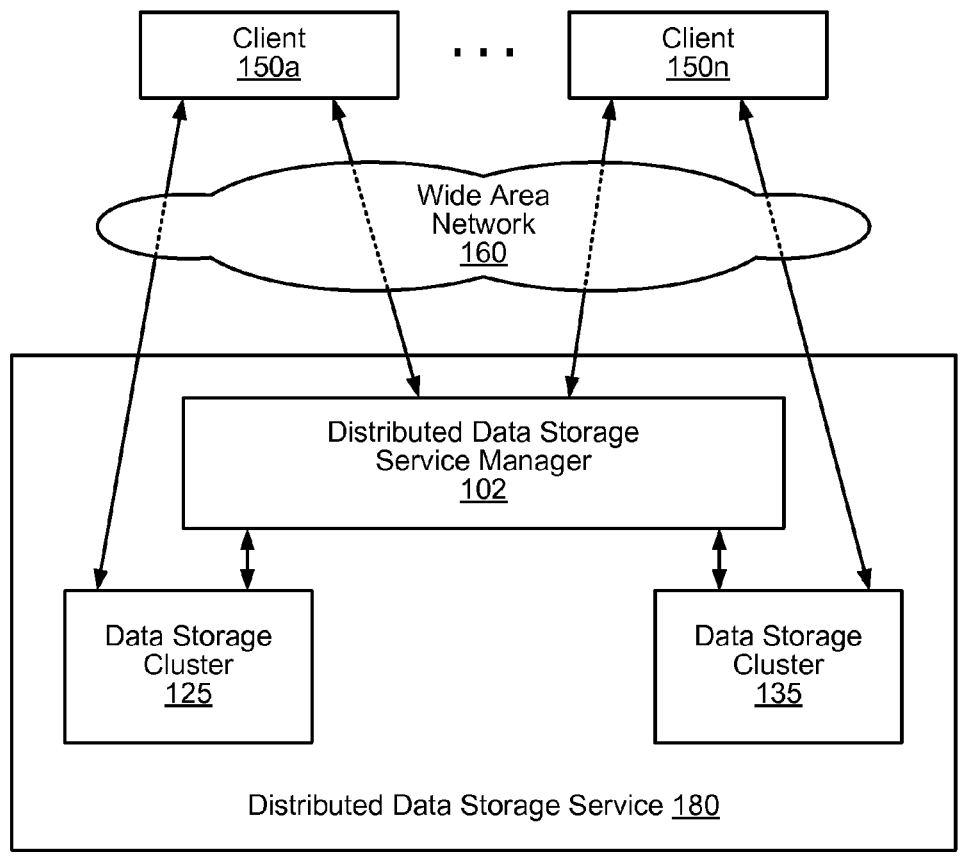
FIG. 1 illustrates an example distributed data storage service that may provide data management services, including cursor remirroring, to clients, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for cursor remirroring are described. Using the systems and methods described herein, remirroring between a master node and a slave node of a cluster may be performed with improved efficiency. At different levels of a cursor remirroring process, different amounts of data may be transferred from the master node to the slave node. As chunks of storage on the master node are replicated in sequence in the remirroring process, a cursor may be placed after the last visited chunk. To avoid the negative performance impact of a mirror fault, write requests to chunks below the cursor (i.e., unmirrored chunks) may be handled differently than write requests to chunks above the cursor (i.e., mirrored chunks). Additional techniques may be used to prevent or minimize get faults and zero faults.

Distributed Data Storage Management

It is not uncommon for entities to collect large amounts of data which may require subsequent storage or management. Although some entities may wish to implement their own data management system for this data, it is increasingly apparent that obtaining data management services may prove a more efficient and cost effective option for those entities who do not wish to manage their own data. For example, a small business may wish to maintain sales records and related data for future data analysis. Instead of investing directly in the data management system to maintain the data and the expertise required to set up and maintain the system, the small business may alternatively find it more efficient to contract with a data management service to store and manage their data. A data management service, such as a distributed data storage system discussed below with regard to FIGS. 1 and 2, may offer clients a variety of different data management services, according to their various needs. In some cases, clients may wish to store and maintain large of amounts data, such as sales records marketing, management reporting, business process management, budget forecasting, financial reporting, website logs and analytics, or many other types or kinds of data.

As discussed above, various clients (e.g., customers, organizations, entities, or users) may wish to store and manage data using a data management service. FIG. 1 illustrates an example distributed data storage service that may provide data management services to clients, according to some embodiments. Specifically, data storage clusters may respond to storage requests (e.g., to write data into storage or read data from storage), along with other data management or storage services.

Users or clients may access a data storage cluster to obtain data storage services. Clients may include users, client applications, and/or data storage service subscribers, according to some embodiments. In this example, each of the clients 150a through 150n is able to access data storage clusters 125 and 135 respectively in the distributed data storage service 180. Each of data storage clusters 125 and 135 may include two or more nodes on which data may be stored on behalf of the clients 150a through 150n who have access to those clusters. Although two clients 150a and 150n and two data storage clusters 125 and 135 are illustrated, it is contemplated that any suitable number of clients and clusters may be used with the techniques described herein.

A client, such as one of clients 150a through 150n, may communicate with a data storage cluster 125 or 135 via a desktop computer, laptop computer, tablet computer, personal digital assistant, mobile device, server, or any other computing system or other device, such as computer system 3000 described below with regard to FIG. 11, configured to send requests to the data storage clusters 125 and 135 and/or receive responses from the data storage clusters 125 and 135. Requests, for example may be formatted as a message that includes parameters and/or data associated with a particular function or service offered by a data storage cluster. Such a message may be formatted according to a particular markup language such as Extensible Markup Language (XML), and/or may be encapsulated using a protocol such as Simple Object Access Protocol (SOAP). Application programmer interfaces (APIs) may be implemented to provide standardized message formats for clients, such as for when clients are communicating with distributed data storage service manager 102.

Clients 150a through 150n may communicate with data storage clusters 125 and 135, hosted by distributed data storage service 180 using a variety of different communication methods, such as over Wide Area Network (WAN) 160 (e.g., the Internet). Private networks, intranets, and other forms of communication networks may also facilitate communication between clients and data storage clusters. A client may assemble a message including a request and convey the message to a network endpoint (e.g., a Uniform Resource Locator (URL)) corresponding to the data storage cluster). For example, a client 150a may communicate via a desktop computer running a local software application, such as a web-client, that is configured to send hypertext transfer protocol (HTTP) requests to data storage cluster 125 over WAN 160. Responses or other data sent to clients may be formatted in similar ways.

In at least some embodiments, a distributed data storage service, as indicated at 180, may host data storage clusters, such as clusters 125 and 135. The distributed data storage service 180 may provide network endpoints to the clients 150a to 150n of the clusters which allow the clients 150a through 150n to send requests and other messages directly to a particular cluster. Various security features may be implemented to prevent unauthorized users from accessing the clusters. Conversely, a client may be given network endpoints for multiple clusters.

Data storage clusters, such as data storage cluster 125 and 135, may be made up of multiple nodes. These clusters may include different numbers of nodes. A node may be implemented using any suitable computing device, such as those described below with regard to computer system 3000 in FIG. 11. In some embodiments, the number of nodes in a data storage cluster may be modified, such as by a cluster scaling request. Nodes of a data storage cluster may implement one or more data slices for storing data. These data slices may be part of storage devices. Clusters may be configured to receive requests and other communications over WAN 160 from clients, such as clients 150a through 150n.

In some embodiments, distributed data storage service 180 may be implemented as part of a web service that allows users to set up, operate, and scale a data storage in a cloud computing environment. The data storage clusters hosted by the web service may provide an enterprise-class database query and management system that allows users to scale the clusters, such as by sending a cluster scaling request to a cluster control interface implemented by the web-service. Scaling clusters may allow users of the web service to perform their data storage functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently.

Distributed data storage service 180 may be implemented by a large collection of computing devices, such as customized or off-the-shelf computing systems, servers, or any other combination of computing systems or devices, such as the various types of devices described below with regard to FIG. 11. Different subsets of these computing devices may be controlled by distributed data storage service manager 202. Distributed data storage service manager 102, for example, may provide a cluster control interface to clients, such as clients 150a through 150n, or any other clients or users who wish to interact with the data storage clusters managed by the distributed data storage service manager 102, which in this example illustration would be data storage clusters 125 and 135. For example, distributed data storage service manager 102 may generate one or more graphical user interfaces (GUIs) for storage clients, which may then be utilized to select various control functions offered by the control interface for the data storage clusters hosted in the distributed data storage service 180.

Figure 2:
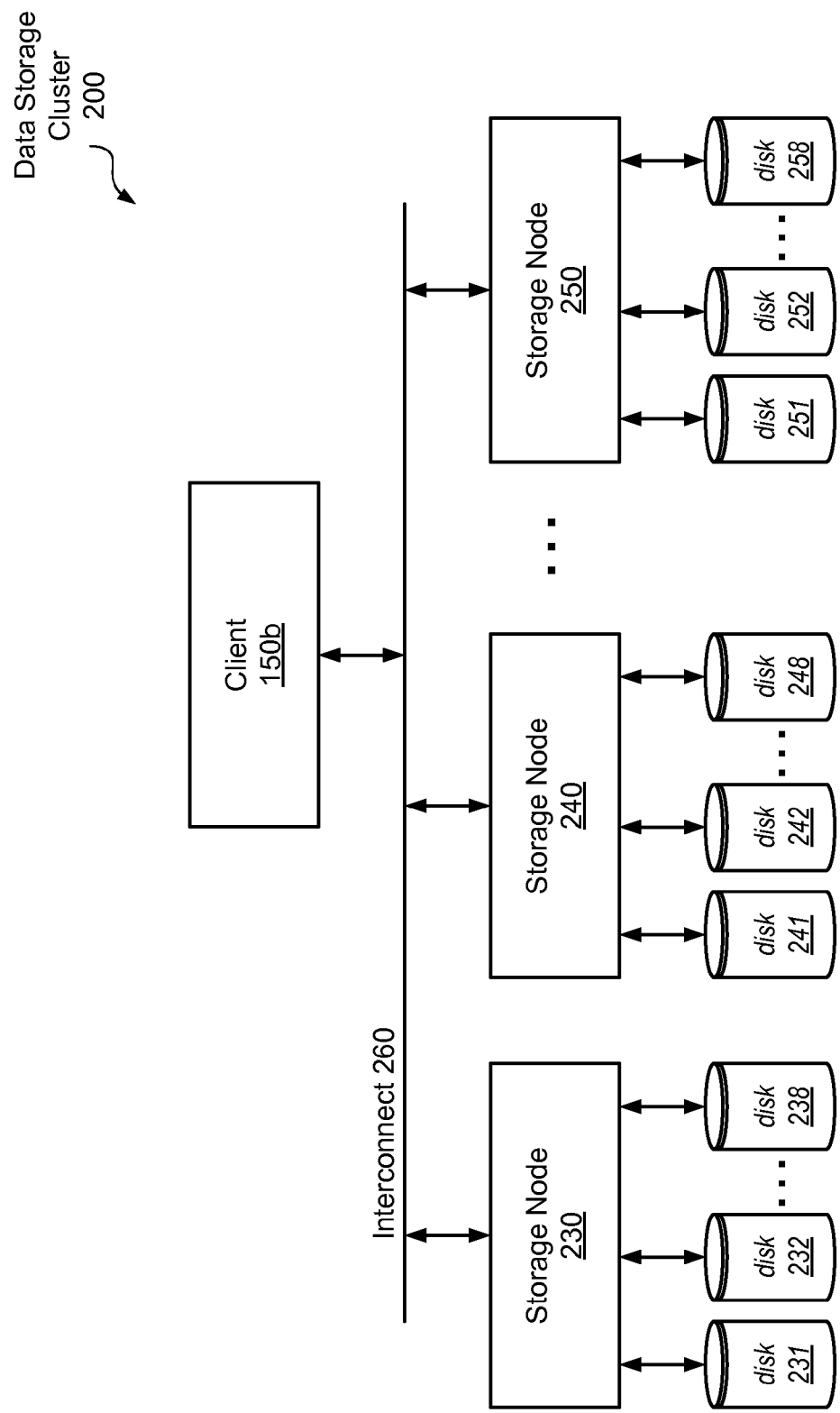
FIG. 2 is a block diagram illustrating a data storage cluster in a distributed data storage service that provides cursor remirroring, according to one embodiment.

FIG. 2 is a block diagram illustrating a data storage cluster in a distributed data storage service, according to one embodiment. As illustrated in this example, a data storage cluster 200 may include storage nodes 230, 240, and 250, which may communicate with each other and with a client 150b over an interconnect 260. These one or more storage nodes, may for example, be implemented on servers or other computing devices, such as those described below with regard to computer system 3000 in FIG. 11. As described herein, each node in a data storage cluster may include one or more disks on which data blocks may be stored on behalf of a client (e.g., users, client applications, and/or distributed data storage service subscribers). In this example, storage node 230 includes disks 231-238, storage node 240 includes disks 241-248, and storage node 250 includes disks 251-258.

Disks, such as the disks 231 through 258 illustrated in FIG. 2, may be may be implemented as one or more of any type of storage devices and/or storage system suitable for storing data accessible to the data storage nodes, including, but not limited to: redundant array of inexpensive disks (RAID) devices, disk drives or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof.

Although FIGS. 1 and 2 have been described and illustrated in the context of a distributed data storage system, the various components illustrated and described in FIGS. 1 and 2 may be easily applied to other data management systems that provide data management and/or storage services for a storing data in a data store. Moreover, the configuration of components, systems, or devices show are not limiting as to other possible configurations. As such, FIGS. 1 and 2 are not intended to be limiting as to embodiments of a data storage cluster, nor limiting as a description of a data storage and management cluster.

In some embodiments, a provider network associated with the distributed data storage service 180 may include numerous data centers hosting various resource pools, such as collections of physical and/or virtualized computer servers, storage devices, networking equipment and the like, that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). These virtual compute instances may be implemented by virtual machines, such as hardware virtual machines, or other forms of software implemented to simulate hardware configurations. Virtual compute instances may be configured to perform the same tasks, functions, and/or services as nodes implemented on physical hardware. In one embodiment, the clients 150a and 150b through 150n as illustrated in FIGS. 1 and 2 may be implemented as virtual compute instances. A number of different types of computing devices may be used singly or in combination to implement the resources of the provider network in different embodiments, including general purpose or special purpose computer servers, storage devices, network devices, and the like.

The provider network may also include a block data store that provides distributed and replicated storage of block data. The block data store may be organized into sets of clusters such as, for example, the data storage cluster 200. Each set of clusters may store user data and serve requests to compute instances such as client 150b. A set of control plane services may coordinate user requests and propagate them to the clusters. Each cluster may include a plurality of nodes such as nodes 230, 240, and/or 250. Individual nodes may store replicas of volume data and may serve read and write requests to compute instances. A node may provide raw, block-level storage to a compute instance, such that a virtual local block storage device may be mounted on the instance. In one embodiment, such storage volumes may behave like raw, unformatted block devices, with user-supplied device names and a block device interface. In one embodiment, a file system may be created on top of a block storage volume. In one embodiment, a volume may be attached to one compute instance at a time, but multiple volumes may be attached to a single instance.

In one embodiment, a block storage volume may comprise a virtual data store that is created from an external data store by adding a layer of metadata to the data stored using the external data store. The external data store may comprise, for example, Amazon Simple Storage Service (S3). Amazon S3 may store object data of various types. Each object in Amazon S3 may be stored in a bucket and may be retrieved via a unique key. The metadata referring to the external data store may be stored locally by the node of the block store (e.g., on various disks of storage node 230, 240, or 250) and may point to storage locations or elements of data in the external data store. The metadata may be stored by the node (e.g., node 230, 240, or 250) along with local data. For example, each node may store a plurality of "chunks" of data. As used herein, the term "chunk" refers to a contiguous block of storage in a node in a block data store. Each individual chunk on a node of the block store may contain locally stored data, may contain metadata for data stored elsewhere, or may be uninitialized. In one embodiment, all the chunks on a volume of the block store may be substantially the same size, regardless of the amount of data they contain. Chunks may be any suitable size, and the size may be configured by a user in some embodiments. In one embodiment, for example, chunks may be configured to be 4 megabytes each.

In one embodiment, the volume data in the block store may be replicated to multiple nodes for durability and availability. Each node may employ a peer-to-peer, fast failover strategy that provisions new replicas if one of the copies gets out of sync or becomes unavailable. The nodes in a cluster may be connected to each other via two networks: a primary network and a secondary network. In one embodiment, the primary network is a high-bandwidth network used in normal operation for all necessary communication with other nodes, with compute instances, and with the control plane services. In one embodiment, the secondary network (i.e., the replication network) is a lower-capacity network that is usable as a back-up network, e.g., to allow nodes to reliably communicate with other nodes in the cluster and provide overflow capacity for data replication. The secondary network may be designed to provide highly reliable connectivity between nodes inside of a cluster. In various embodiments, one or both of the networks may be implemented using the interconnect 260.

In addition to the clusters, a set of control plane services may accept user requests and propagate them to the appropriate cluster. The control plane services may also act as the authority to the clusters when they elect primary replicas for each volume in the cluster. In one embodiment, to ensure consistency, there may be a single primary replica for each volume at any time. The control plane may be implemented using multiple different services.

Cursor Remirroring

Within a cluster, a node that replicates data to another node is referred to as a master node, and the node to which the data is replicated is referred to as a slave node. The slave node may be said to mirror the master node. In one embodiment, after the slave has mirrored the data stored by the master node, customer writes to the master node may be duplicated to the slave node so that the same write operation is performed on both nodes. When a master node loses connectivity to a slave node, the master node may assume that the slave node experienced a failure. Consequently, to preserve durability, a new slave node should be found to which the master node can replicate its data. The process of replicating the data from the master node to a new slave node is referred to as remirroring. As part of the remirroring process, the master node may search its cluster for another node with enough available server space for the replica, establish connectivity with the new server, and propagate the volume data to the new server. In a normally functioning cluster, finding a location for the new replica may occurs very quickly, e.g., in milliseconds. In order to protect against customer data loss, while data is being remirrored, all nodes in the cluster that have copies of the data may hold onto the data until they can confirm that another node (i.e., the new slave node) has taken ownership of their portion. Additionally, to ensure the consistency of volume data, when data on a customer's volume is being remirrored, access to that data may be blocked until a new primary (or writable) replica has been identified. Using the systems and methods described herein, remirroring techniques referred to as cursor remirroring may provide improved efficiency along with reliability.

As discussed above, a volume of the block store may be divided into chunks of the same or similar size (e.g., 4 MB). Each chunk can be in different state, depending on factors such as the client's read/write and snapshot activity. In one embodiment, a chunk may be in one of five states: dirty, clean on disk, clean not on disk, zeroed, and uninitialized. A dirty chunk has been written locally (i.e., on the storage maintained locally by the node) by the client, but the write may not be reflected in an underlying data store or external data store such as Amazon S3. A chunk that is clean on disk is not dirty and is stored locally (i.e., on the storage maintained locally by the node) and also stored in the underlying data store or external data store such as Amazon S3. A chunk that is clean and not on disk is not dirty and is not stored locally (i.e., on the storage maintained locally by the node) but is stored in the underlying data store or external data store such as Amazon S3; such a chunk can be retrieved from the external data store, e.g., using an appropriate key to retrieve it from Amazon S3. A zeroed chunk has been overwritten with zeroes to initialize the chunk for future activity by the node. An uninitialized chunk has not been used by the node, and its contents may be unknown.

In one embodiment, a node in the block store may experience any of three types of faults during or after a remirror: a mirror fault, a get fault, and/or a zero fault. A mirror fault may occur when a write occurs to a chunk that is not stored on the slave node. As a consequence of the mirror fault, the slave node may ask to receive the full chunk from the master node. Accordingly, the master node may send the full chunk to the slave node even for a small write. For example, if the chunk is 4 megabytes in size, but the write is only 8 kilobytes in size, the master node may send the entire chunk to the slave node if the slave does not already have the chunk. A get fault may occur when a read or write occurs on a chunk that is not stored on the master node. As a consequence of the get fault, the master node may obtain the full chunk from the external data store and then perform the read or write operation. Again, the get fault may result in the entire chunk being transferred to the master node even for a write that is much smaller than the chunk size. A get fault on the master node may be accompanied by a mirror fault on the slave node, e.g., for a write to a clean chunk not on disk. A zero fault may occur when a read or write occurs on a chunk that has not been zeroed out in an initialization process.

Using the systems and methods for cursor remirroring as described herein, the various types of faults may be prevented or minimized to reduce the performance impact of the remirroring process. A cursor remirroring process may include visiting each chunk in the node, transferring chunk data or chunk metadata to the slave node for some types of chunks, and setting the position of a cursor directly after the last mirrored chunk on the master node. Using cursor remirroring, write requests for chunks positioned above the cursor may be handled differently than write requests for chunks positioned below the cursor. For example, any write requests to chunks below the cursor (i.e., to chunks that have not been mirrored to the slave node) may not be forwarded to the slave immediately. Instead, the write operation on the slave node may be postponed until the relevant chunk is reached in the sequence of chunks followed by the mirroring process, e.g., until the chunk data for the chunk (as modified by the write operation performed on the master node) has been sent to the slave node. In this manner, mirror faults may be avoided or reduced.

In one embodiment, multiple (e.g., up to four) levels of cursor remirroring may be provided. The level of cursor remirroring as applied to a particular block store may be selected by a customer or may be selected automatically. In a first level of cursor remirroring, chunk data (e.g., the data contents of the chunk) may be replicated from master to slave for dirty chunks, and chunk metadata (e.g., one or more references, links, or keys to data in an external data store) may be replicated for clean chunks. In a second level of cursor remirroring, everything stored locally by the master node may be replicated: dirty chunks and clean chunks on disk may be copied to the slave node, and metadata for clean chunks not on disk may also be copied to the slave node. In a third level of cursor remirroring, dirty chunks and all clean chunks (both on disk and not on disk) may be copied to the slave node; clean chunks not on disk may be retrieved from the external data store. In a fourth level of cursor remirroring, dirty chunks and clean chunks may be handled as in the third level, and uninitialized chunks may be zeroed out (i.e., by being overwritten with zeroes) as they are encountered in the sequence.

In one embodiment, sub-chunks may be used to reduce the latency of the remirroring process, e.g., when the remirroring and customer input/output (I/O) access collide. Any suitable size may be selected for the sub-chunks. In one embodiment, the sub-chunks may be 64 kilobytes each for a chunk of 4 megabytes in size. In one embodiment, the cursor remirroring techniques described herein may be applied to sub-chunks inside one or more chunks. In this manner, writes to sub-chunks that are below the sub-cursor within a chunk may only be performed on the master node to avoid the performance penalty associated with a mirror fault.

In one embodiment, remirroring traffic among the nodes may be limited by throttling the traffic. Customer I/O may be given a higher priority as foreground traffic, and remirroring traffic may be given a lower priority as background traffic. In one embodiment, snapshot activity may also be given a lower priority as background traffic. Additionally, multiple channels may be used for communication among nodes, e.g., between the master node and the slave node.

In one embodiment, cursor remirroring techniques may be extended to N-way remirroring where the remirroring runs in single-redundant mode for N=1. For example, in the case of a network partition event, instead of remirroring the entire block store, each volume may be placed in single-redundant mode before it tries to find a peer for remirroring. In case of a snapshot operation that copies everything on a node to the external data store, a third peer (N=3) may be dedicated to pushing chunks to the external data store. For N-way remirroring, the variable N may be changed as the situation demands. For example, the cursor remirroring process may go from normal 2-way remirroring to single-redundant 1-way remirroring or to 3-way remirroring when customers are performing snapshots.

Figure 3:
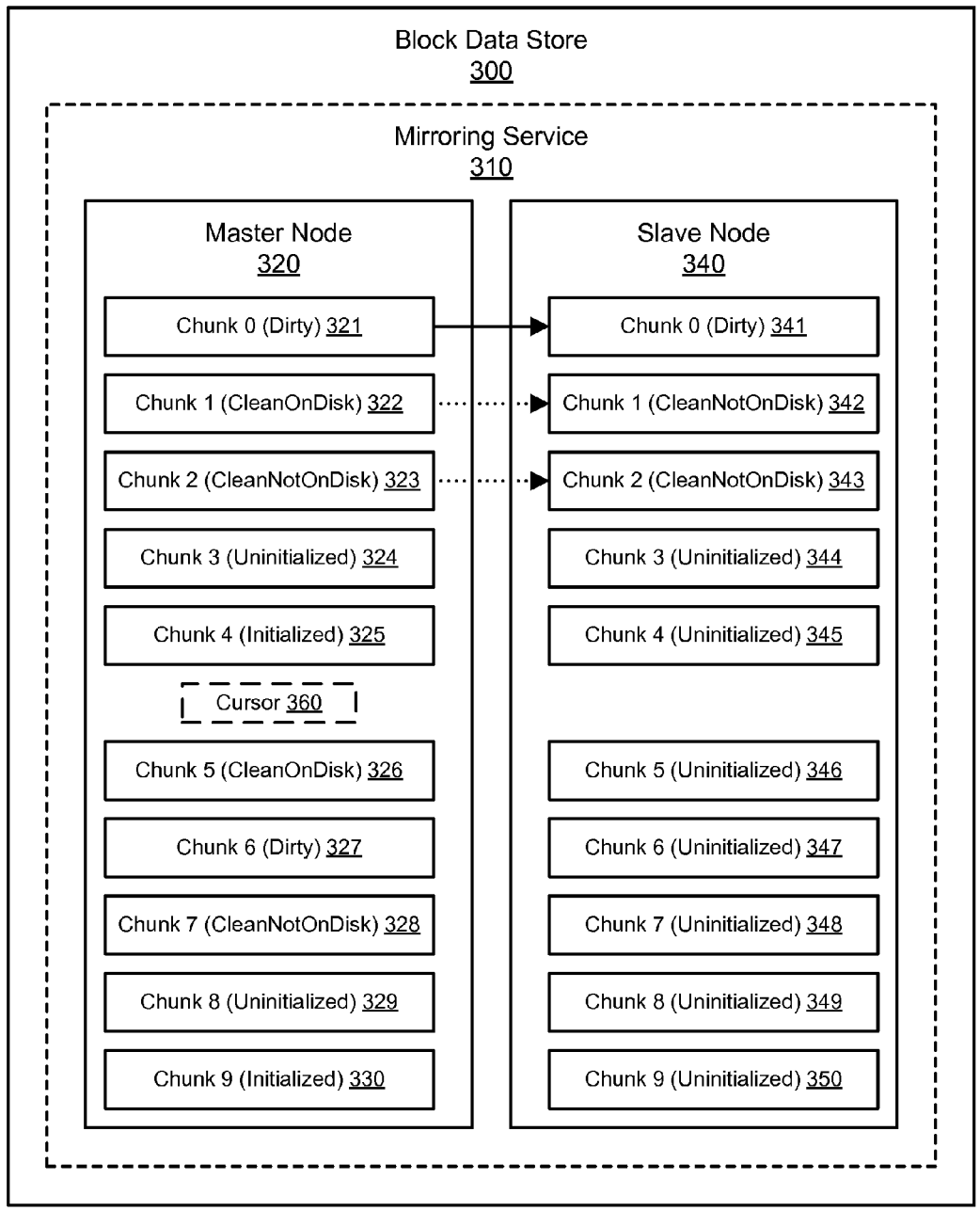
FIG. 3 illustrates an example of a block data store undergoing a cursor remirroring process, according to one embodiment.

FIG. 3 illustrates an example of a block data store undergoing a cursor remirroring process, according to one embodiment. A block data store 300 may include multiple nodes, e.g., a master node 320 and a slave node 340 selected to be a mirror for the master node 320. The block data store 300 may be implemented using any suitable storage technologies, such as those discussed with reference to FIG. 2. In performing aspects of a mirroring process (also referred to herein as a remirroring process), a mirroring service 310 may discover one or more slave nodes and replicate data and/or metadata from the master node 320 to one or more nodes such as slave node 340.

Figure 11:
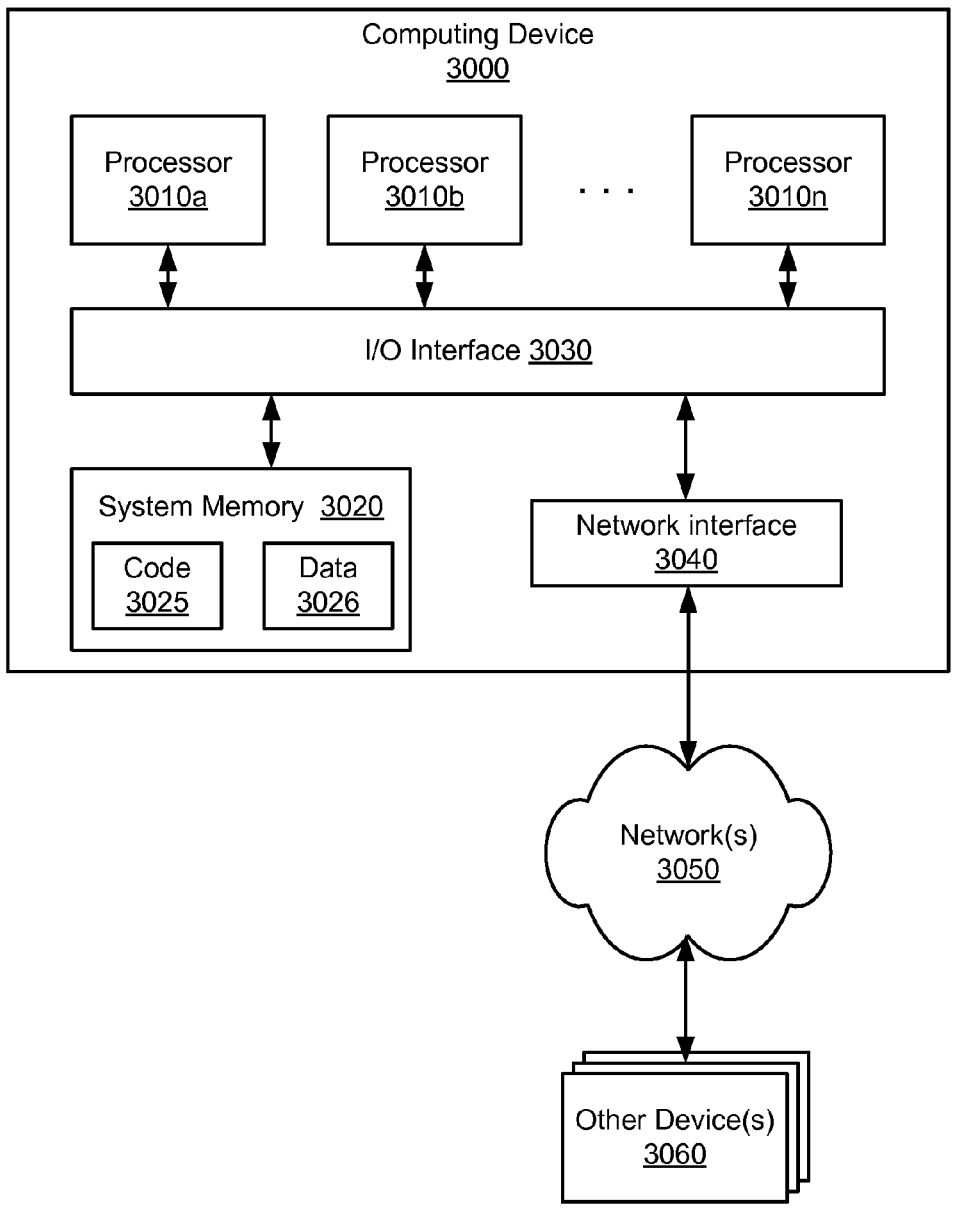
FIG. 11 illustrates an example of a computing device that may be used in some embodiments.

The block data store 300 may be implemented using one or more computing devices, any of which may be implemented by the example computing device 3000 illustrated in FIG. 11. In various embodiments, the functionality of the mirroring service 310 may be provided by the same computing device or by different computing devices that are communicatively coupled, e.g., via a network. The mirroring service 310 may be implemented using any combination of software and hardware usable to perform its functions. In one embodiment, for example, aspects of the mirroring service 310 may be located on and performed by the master node 320 and/or on a computing device that controls the master node 320. Similarly, aspects of the mirroring service 310 may be located on and performed by the slave node 340 and/or on a computing device that controls the slave node 340.

In one embodiment, FIG. 3 illustrates a first level of cursor remirroring. In a first level of cursor remirroring, chunk data (e.g., the data contents of the chunk) may be replicated from master to slave for dirty chunks, and chunk metadata (e.g., one or more references, links, or keys to data in an external data store) may be replicated for clean chunks. The mirroring process may include visiting each of the plurality of chunks and placing a cursor after the last visited chunk. The chunks may be visited in a particular sequence. In various embodiments, the sequence may be determined in any suitable manner. In one embodiment, the sequence may be random. Accordingly, the sequence of the chunks shown in FIG. 3 may not represent the order in which the chunks are stored on disk. In one embodiment, the sequence may be based on an order in which the chunks are stored, e.g., in order from the first chunk to the last chunk on the master node. The cursor may be implemented as a placeholder or other metadata maintained by the mirroring service, such as a map of visited chunks, and may not represent any data stored between chunks on the master node 320. As shown in FIG. 3, the first five chunks have been processed by the mirroring process, and the cursor 360 is placed after chunk 325.

In the first level of cursor remirroring, the mirroring process may copy the chunk data (i.e., the actual contents of the chunk as stored on the master node) for any dirty chunk, such as by replicating the chunk data for the zeroth chunk 321 (dirty) on the master node 320 to the corresponding zeroth chunk 341 (dirty) on the slave node 340. In the first level of cursor remirroring, the mirroring process may copy the chunk metadata (e.g., links or keys to data elements not stored on the master node) for clean chunks. As shown in the example, the mirroring process may thus replicate the chunk metadata for the first chunk 322 (clean on disk) on the master node to the corresponding first chunk 342 (clean not on disk) on the slave node, even though the first chunk is stored locally on the master node 320. The mirroring process may also replicate the chunk metadata for the second chunk 323 (clean not on disk) on the master node to the corresponding second chunk 343 (clean not on disk) on the slave node. The third chunk 324 is uninitialized on the master node, and the fourth chunk 325 is unused but initialized (e.g., it has been filled with zeroes) on the master node. In the first level of cursor remirroring, the remirroring process may leave the corresponding third chunk 344 and fourth chunk 345 as uninitialized chunks on the slave node.

In the example shown in FIG. 3, five chunks are located below the cursor: a fifth chunk 326 (clean on disk), a sixth chunk 327 (dirty), a seventh chunk 328 (clean not on disk), an eighth chunk 329 (uninitialized), and a ninth chunk 330 (initialized). As the mirroring process visits each of these chunks, they will be processed in a similar manner as their counterparts above the cursor. Before these chunks are mirrored, their corresponding chunks on the slave node may remain uninitialized: the fifth chunk 346, the sixth chunk 347, the seventh chunk 348, the eighth chunk 349, and the ninth chunk 350. As will be discussed below, write operations on the chunks below the cursor may be handled in a different manner than write operations on the chunks above the cursor.

Figure 4:
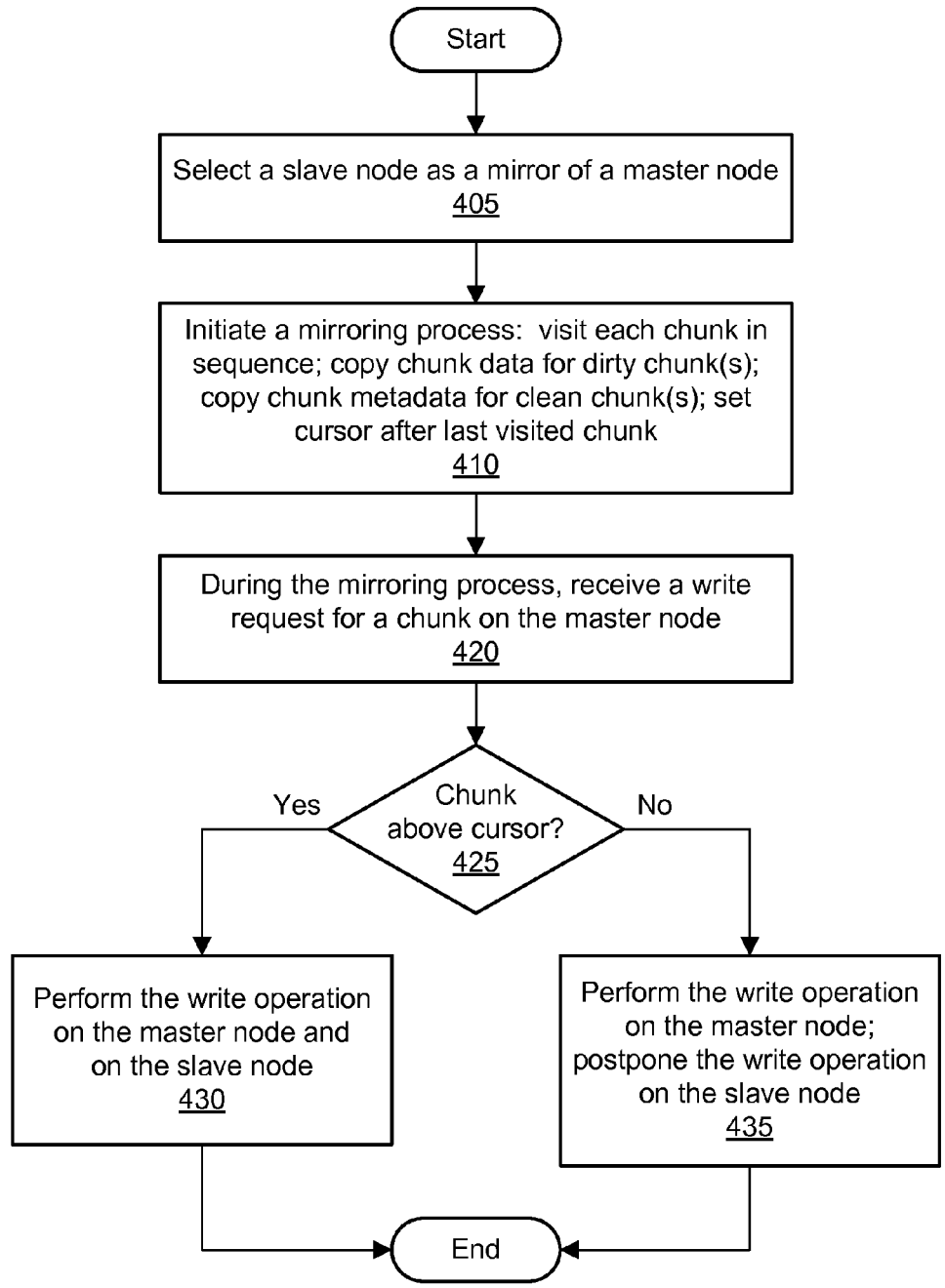
FIG. 4 is a flowchart illustrating a method for cursor remirroring, according to one embodiment.

FIG. 4 is a flowchart illustrating a method for cursor remirroring, according to one embodiment. In one embodiment, FIG. 4 illustrates a first level of cursor remirroring. As shown in 405, a slave node may be selected as a mirror of a master node. The slave node may be selected from a plurality of other nodes within the same cluster as the master node. The slave node may be selected based on any suitable criteria, such as the size of the available storage managed by the slave node.

As shown in 410, a mirroring process may be initiated for master node. The master node may store a plurality of chunks, including one or more dirty chunks and one or more clean chunks. Individual ones of the clean chunks may be stored locally by the master node or may be stored on an external data store which is linked to the master node by chunk metadata stored locally by the master node. The mirroring process may include visiting each of the plurality of chunks in a sequence, e.g., in order from the first chunk to the last chunk on the master node. At the first level of cursor remirroring, the mirroring process may include copying the chunk data for each dirty chunk to the slave node and copying the chunk metadata for each clean chunk to the slave node.

As shown in 420, during the initiated mirroring process, a request for a write operation may be received, e.g., from a client or customer. The request may seek to write data to one of the chunks stored by the master node. As shown in 425, the mirroring process may determine whether the chunk that is subject to the request is above or below the cursor. In other words, the mirroring process may determine whether the chunk that is subject to the request has been visited by the ongoing mirroring process.

As shown in 430, if the chunk in the request has been visited in the mirroring process, then the requested write operation may be performed on the master node and on the slave node. Performing the write operation on the slave node may include forwarding the write request to the slave node.

As shown in 435, if the chunk in the request has not been visited in the mirroring process, then the write operation is performed on the master node. The write operation or its effects on the slave node may be postponed. The write operation on the slave node may be postponed until chunk data for the requested chunk as been copied to the slave node in the mirroring process. When the cursor reaches the requested chunk, the chunk as modified by the write operation on the master node may be replicated to the slave node.

Alternatively, when the cursor reaches the requested chunk, the unmodified chunk may be transferred to the slave node along with the write request, and the write request may be performed on the slave node. In this manner, a mirror fault may be avoided.

Figure 5:
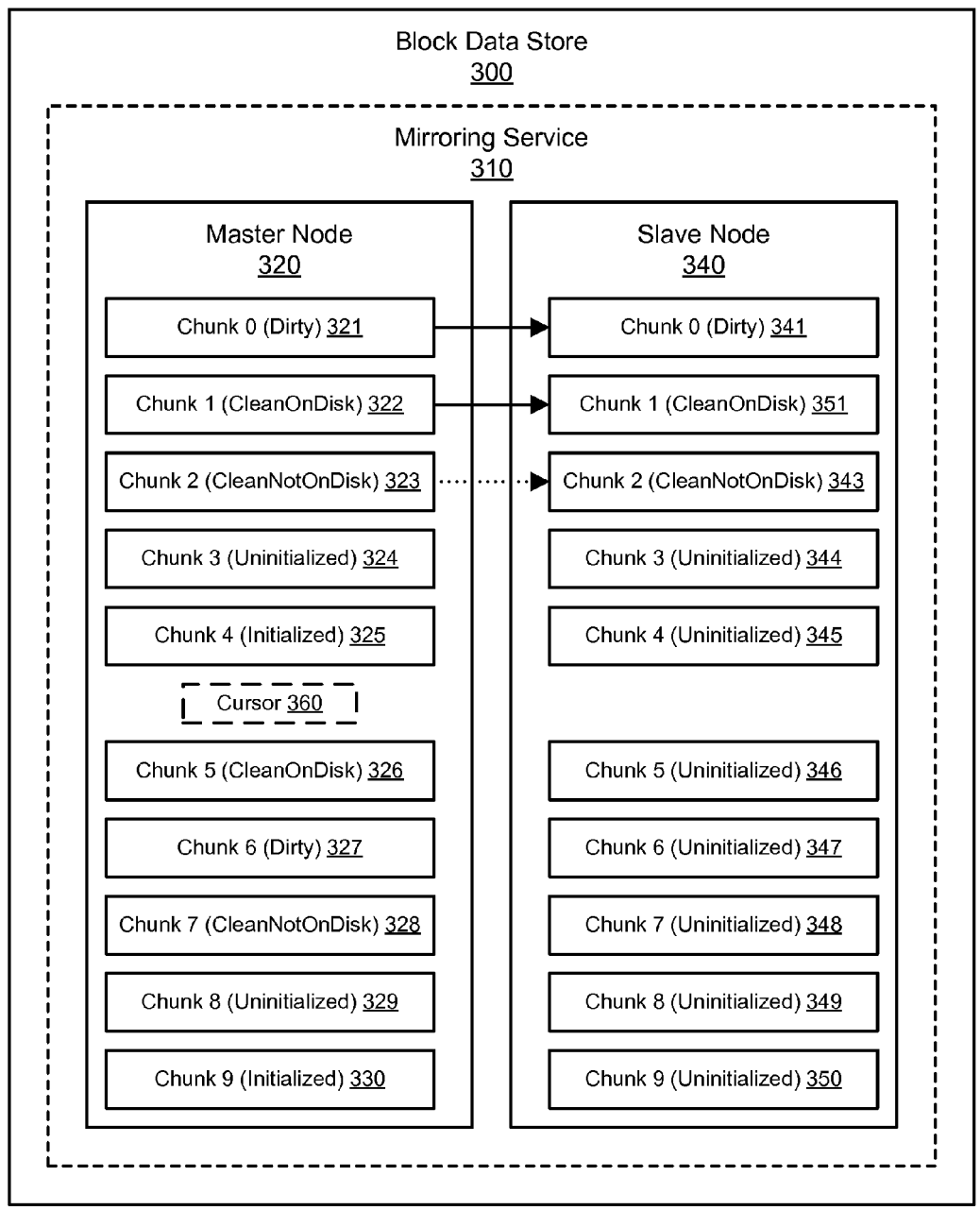
FIG. 5 illustrates an example of a block data store undergoing a second level of a cursor remirroring process, according to one embodiment.

FIG. 5 illustrates an example of a block data store undergoing a second level of a cursor remirroring process, according to one embodiment. In a second level of cursor remirroring, everything stored locally by the master node may be replicated: dirty chunks and clean chunks on disk may be copied to the slave node, and metadata for clean chunks not on disk may also be copied to the slave node. The second level of the mirroring process may again include visiting each of the plurality of chunks and placing a cursor after the last visited chunk. The chunks may be visited in a particular sequence. In various embodiments, the sequence may be determined in any suitable manner. In one embodiment, the sequence may be random. Accordingly, the sequence of the chunks shown in FIG. 5 may not represent the order in which the chunks are stored on disk. In one embodiment, the sequence may be based on an order in which the chunks are stored, e.g., in order from the first chunk to the last chunk on the master node. The cursor may be implemented as a placeholder or other metadata maintained by the mirroring service, such as a map of visited chunks, and may not represent any data stored between chunks on the master node 320. As shown in FIG. 5, the first five chunks have been processed by the mirroring process, and the cursor 360 is placed after chunk 325.

In the second level of cursor remirroring, the mirroring process may copy the chunk data (i.e., the actual contents of the chunk as stored on the master node) for any dirty chunk, such as by replicating the chunk data for the zeroth chunk 321 (dirty) on the master node 320 to the corresponding zeroth chunk 341 (dirty) on the slave node 340. In the second level of cursor remirroring, the mirroring process may also copy the chunk data for clean chunks that are stored locally on the master node 320. As shown in the example, the mirroring process may thus replicate the chunk metadata for the first chunk 322 (clean on disk) on the master node to the corresponding first chunk 351 (clean on disk) on the slave node. In the second level of cursor remirroring, the mirroring process may copy the chunk metadata (e.g., links or keys to data elements not stored on the master node) for clean chunks that are not stored locally on the master node 320. Accordingly, the mirroring process may replicate the chunk metadata for the second chunk 323 (clean not on disk) on the master node to the corresponding second chunk 343 (clean not on disk) on the slave node. The third chunk 324 is uninitialized on the master node, and the fourth chunk 325 is unused but initialized (e.g., it has been filled with zeroes) on the master node. In the second level of cursor remirroring, the remirroring process may leave the corresponding third chunk 344 and fourth chunk 345 as uninitialized chunks on the slave node.

In the example shown in FIG. 5, five chunks are located below the cursor: a fifth chunk 326 (clean on disk), a sixth chunk 327 (dirty), a seventh chunk 328 (clean not on disk), an eighth chunk 329 (uninitialized), and a ninth chunk 330 (initialized). As the mirroring process visits each of these chunks, they will be processed in a similar manner as their counterparts above the cursor. Before these chunks are mirrored, their corresponding chunks on the slave node may remain uninitialized: the fifth chunk 346, the sixth chunk 347, the seventh chunk 348, the eighth chunk 349, and the ninth chunk 350. In the second level of cursor remirroring, write operations on the chunks below the cursor may be handled in a different manner than write operations on the chunks above the cursor.

Figure 6:
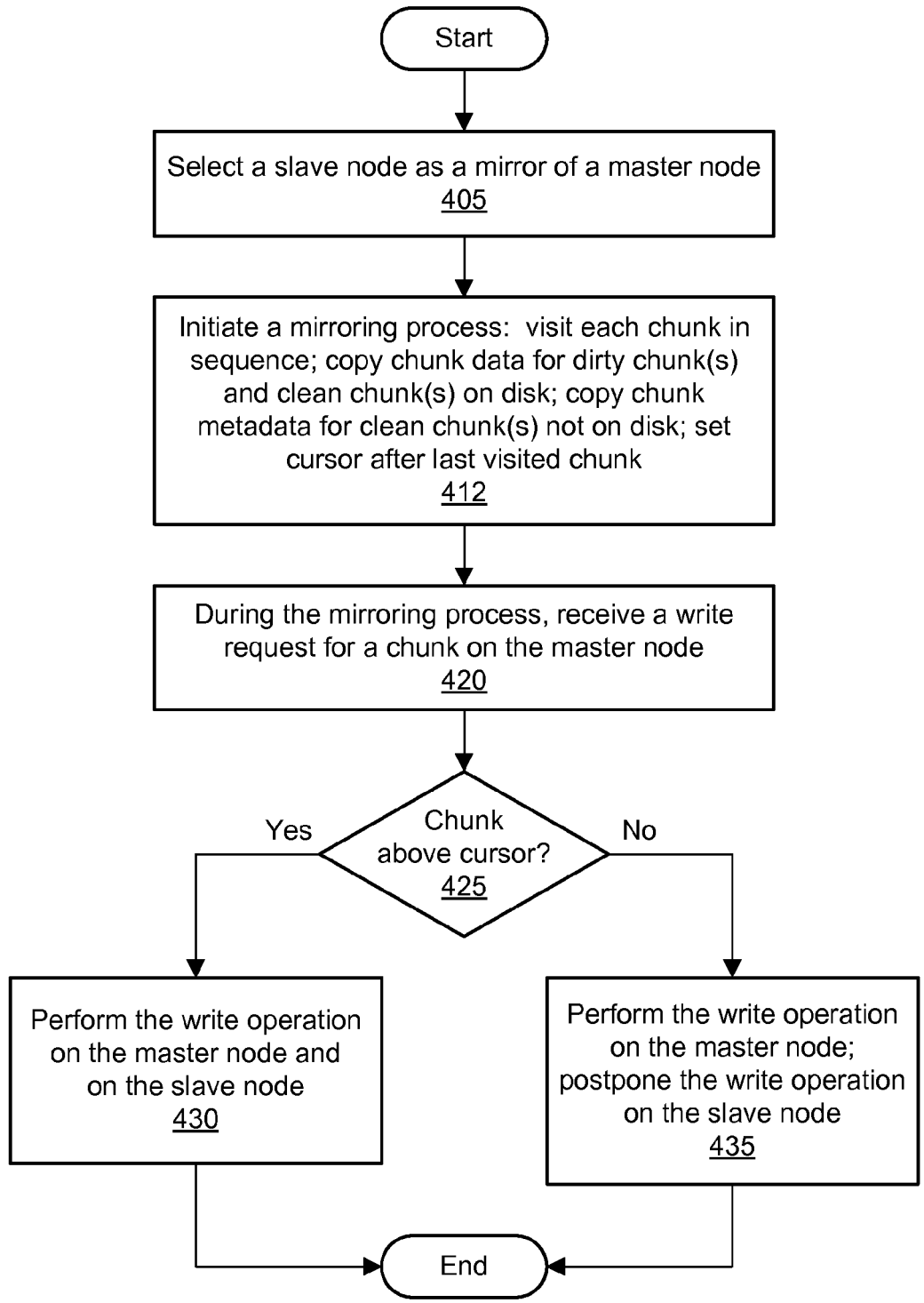
FIG. 6 is a flowchart illustrating a method for a second level of cursor remirroring, according to one embodiment.

FIG. 6 is a flowchart illustrating a method for cursor remirroring, according to one embodiment. In one embodiment, FIG. 6 illustrates a second level of cursor remirroring. As shown in 405, a slave node may be selected as a mirror of a master node. The slave node may be selected from a plurality of other nodes within the same cluster as the master node. The slave node may be selected based on any suitable criteria, such as the size of the available storage managed by the slave node.

As shown in 412, a mirroring process may be initiated for master node. The master node may store a plurality of chunks, including one or more dirty chunks and one or more clean chunks. Individual ones of the clean chunks may be stored locally by the master node or may be stored on an external data store which is linked to the master node by chunk metadata stored locally by the master node. The mirroring process may include visiting each of the plurality of chunks in a sequence, e.g., in order from the first chunk to the last chunk on the master node. At the second level of cursor remirroring, the mirroring process may include copying the chunk data to the slave node for each dirty chunk on the master node, copying the chunk data to the slave node for each clean chunk that is stored locally on the master node, and copying the chunk metadata to the slave node for each clean chunk that is not stored locally on the master node.

As shown in 420, during the initiated mirroring process, a request for a write operation may be received, e.g., from a client or customer. The request may seek to write data to one of the chunks stored by the master node. As shown in 425, the mirroring process may determine whether the chunk that is subject to the request is above or below the cursor. In other words, the mirroring process may determine whether the chunk that is subject to the request has been visited by the ongoing mirroring process.

As shown in 430, if the chunk in the request has been visited in the mirroring process, then the requested write operation may be performed on the master node and on the slave node. Performing the write operation on the slave node may include forwarding the write request to the slave node.

As shown in 435, if the chunk in the request has not been visited in the mirroring process, then the write operation is performed on the master node. The write operation or its effects on the slave node may be postponed. The write operation on the slave node may be postponed until chunk data for the requested chunk as been copied to the slave node in the mirroring process. When the cursor reaches the requested chunk, the chunk as modified by the write operation on the master node may be replicated to the slave node. Alternatively, when the cursor reaches the requested chunk, the unmodified chunk may be transferred to the slave node along with the write request, and the write request may be performed on the slave node. In this manner, a mirror fault may be avoided.

Figure 7:
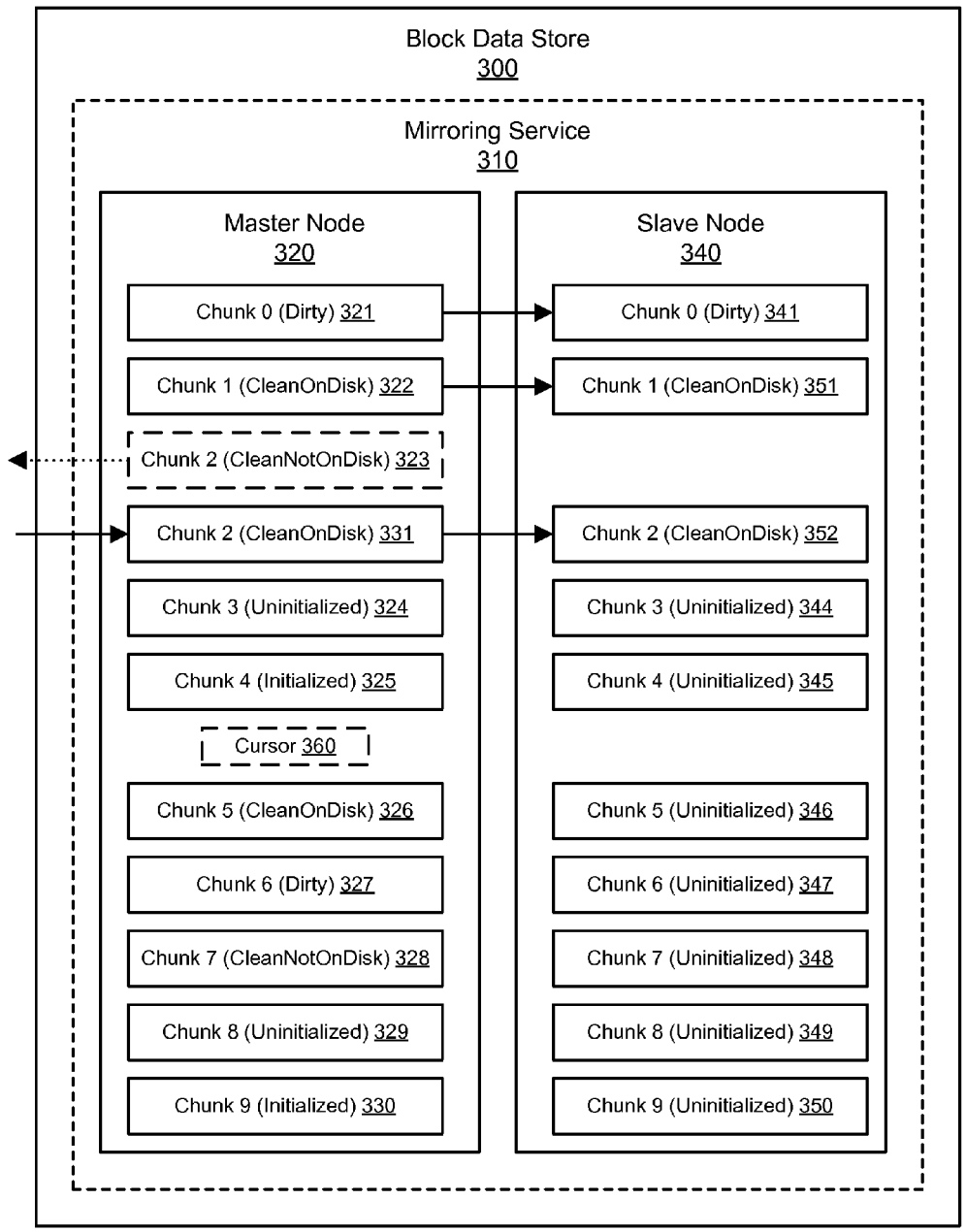
FIG. 7 illustrates an example of a block data store undergoing a third level of a cursor remirroring process, according to one embodiment.

FIG. 7 illustrates an example of a block data store undergoing a third level of a cursor remirroring process, according to one embodiment. In a third level of cursor remirroring, dirty chunks and all clean chunks (both on disk and not on disk) may be copied to the slave node; clean chunks not on disk may be retrieved from the external data store. The third level of the mirroring process may again include visiting each of the plurality of chunks and placing a cursor after the last visited chunk. The chunks may be visited in a particular sequence. In various embodiments, the sequence may be determined in any suitable manner. In one embodiment, the sequence may be random. Accordingly, the sequence of the chunks shown in FIG. 7 may not represent the order in which the chunks are stored on disk. In one embodiment, the sequence may be based on an order in which the chunks are stored, e.g., in order from the first chunk to the last chunk on the master node. The cursor may be implemented as a placeholder or other metadata maintained by the mirroring service, such as a map of visited chunks, and may not represent any data stored between chunks on the master node 320. As shown in FIG. 7, the first five chunks have been processed by the mirroring process, and the cursor 360 is placed after chunk 325.

In the third level of cursor remirroring, the mirroring process may copy the chunk data (i.e., the actual contents of the chunk as stored on the master node) for any dirty chunk, such as by replicating the chunk data for the zeroth chunk 321 (dirty) on the master node 320 to the corresponding zeroth chunk 341 (dirty) on the slave node 340. In the third level of cursor remirroring, the mirroring process may also copy the chunk data for clean chunks that are stored locally on the master node 320. As shown in the example, the mirroring process may thus replicate the chunk metadata for the first chunk 322 (clean on disk) on the master node to the corresponding first chunk 351 (clean on disk) on the slave node. In the third level of cursor remirroring, the mirroring process may proactively obtain the chunk data for any clean chunk that is not stored locally on the master node 320, e.g., using the chunk metadata for the chunk. This operation may prevent the occurrence of get faults. The mirroring process may then replicate the chunk data to the slave node. Accordingly, the mirroring process may obtain the chunk data 331 for the second chunk 323 (clean not on disk) and replicate the chunk data 331 (clean on disk) from the master node to the corresponding second chunk 352 (clean on disk) on the slave node. The third chunk 324 is uninitialized on the master node, and the fourth chunk 325 is unused but initialized (e.g., it has been filled with zeroes) on the master node. In the third level of cursor remirroring, the remirroring process may leave the corresponding third chunk 344 and fourth chunk 345 as uninitialized chunks on the slave node.

In the example shown in FIG. 7, five chunks are located below the cursor: a fifth chunk 326 (clean on disk), a sixth chunk 327 (dirty), a seventh chunk 328 (clean not on disk), an eighth chunk 329 (uninitialized), and a ninth chunk 330 (initialized). As the mirroring process visits each of these chunks, they will be processed in a similar manner as their counterparts above the cursor. Before these chunks are mirrored, their corresponding chunks on the slave node may remain uninitialized: the fifth chunk 346, the sixth chunk 347, the seventh chunk 348, the eighth chunk 349, and the ninth chunk 350. In the third level of cursor remirroring, write operations on the chunks below the cursor may be handled in a different manner than write operations on the chunks above the cursor.

Figure 8:
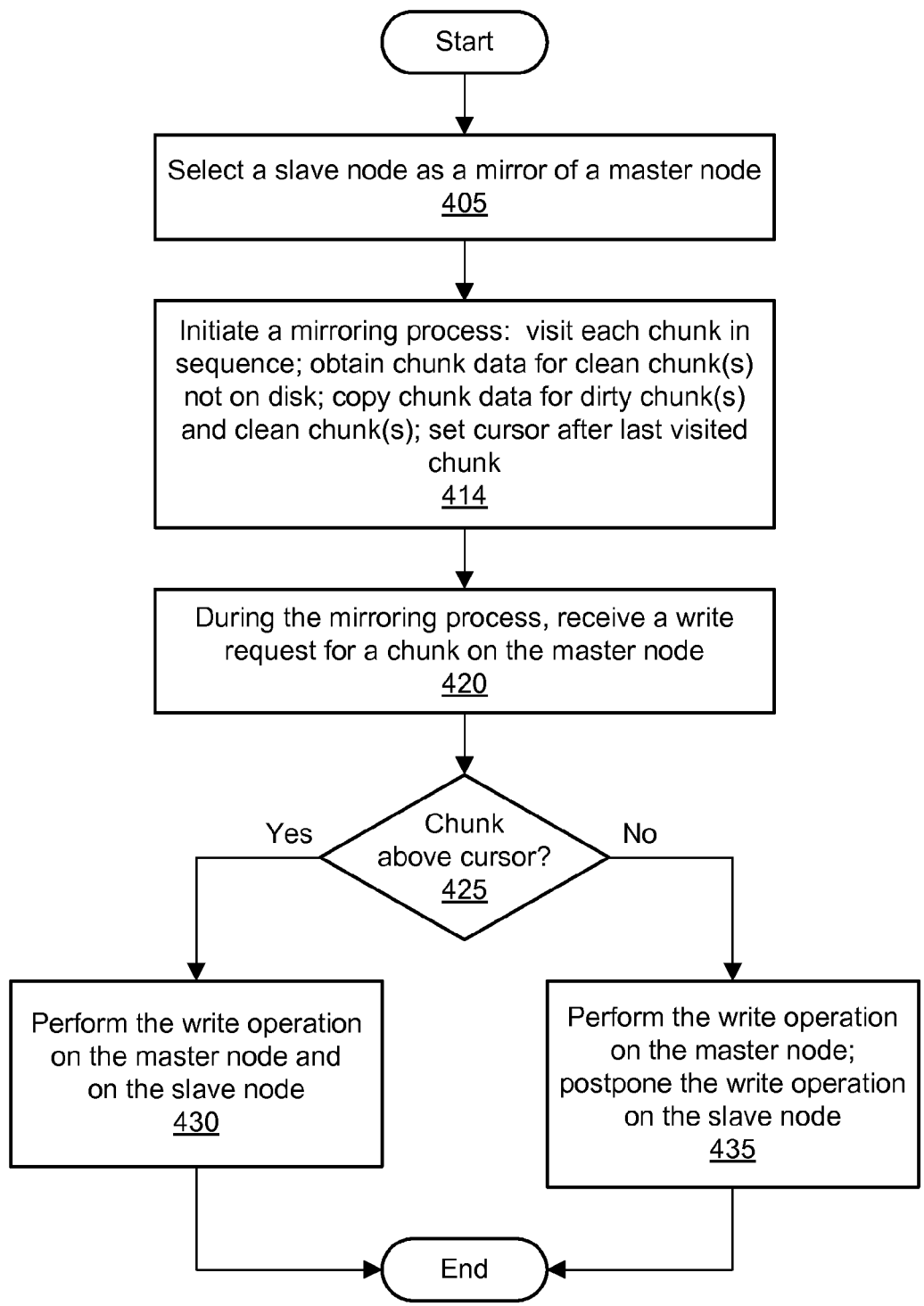
FIG. 8 is a flowchart illustrating a method for a third level of cursor remirroring, according to one embodiment.

FIG. 8 is a flowchart illustrating a method for cursor remirroring, according to one embodiment. In one embodiment, FIG. 8 illustrates a third level of cursor remirroring. As shown in 405, a slave node may be selected as a mirror of a master node. The slave node may be selected from a plurality of other nodes within the same cluster as the master node. The slave node may be selected based on any suitable criteria, such as the size of the available storage managed by the slave node.

As shown in 414, a mirroring process may be initiated for master node. The master node may store a plurality of chunks, including one or more dirty chunks and one or more clean chunks. Individual ones of the clean chunks may be stored locally by the master node or may be stored on an external data store which is linked to the master node by chunk metadata stored locally by the master node. The mirroring process may include visiting each of the plurality of chunks in a sequence, e.g., in order from the first chunk to the last chunk on the master node. At the third level of cursor remirroring, the mirroring process may include copying the chunk data to the slave node for each dirty chunk on the master node, obtaining the chunk data (i.e., from the external data store) for each clean chunk that is not stored locally on the master node, and then copying the chunk data to the slave node for each clean chunk on the master node.

As shown in 420, during the initiated mirroring process, a request for a write operation may be received, e.g., from a client or customer. The request may seek to write data to one of the chunks stored by the master node. As shown in 425, the mirroring process may determine whether the chunk that is subject to the request is above or below the cursor. In other words, the mirroring process may determine whether the chunk that is subject to the request has been visited by the ongoing mirroring process.

As shown in 430, if the chunk in the request has been visited in the mirroring process, then the requested write operation may be performed on the master node and on the slave node. Performing the write operation on the slave node may include forwarding the write request to the slave node.

As shown in 435, if the chunk in the request has not been visited in the mirroring process, then the write operation is performed on the master node. The write operation or its effects on the slave node may be postponed. The write operation on the slave node may be postponed until chunk data for the requested chunk as been copied to the slave node in the mirroring process. When the cursor reaches the requested chunk, the chunk as modified by the write operation on the master node may be replicated to the slave node. Alternatively, when the cursor reaches the requested chunk, the unmodified chunk may be transferred to the slave node along with the write request, and the write request may be performed on the slave node. In this manner, a mirror fault may be avoided.

Figure 9:
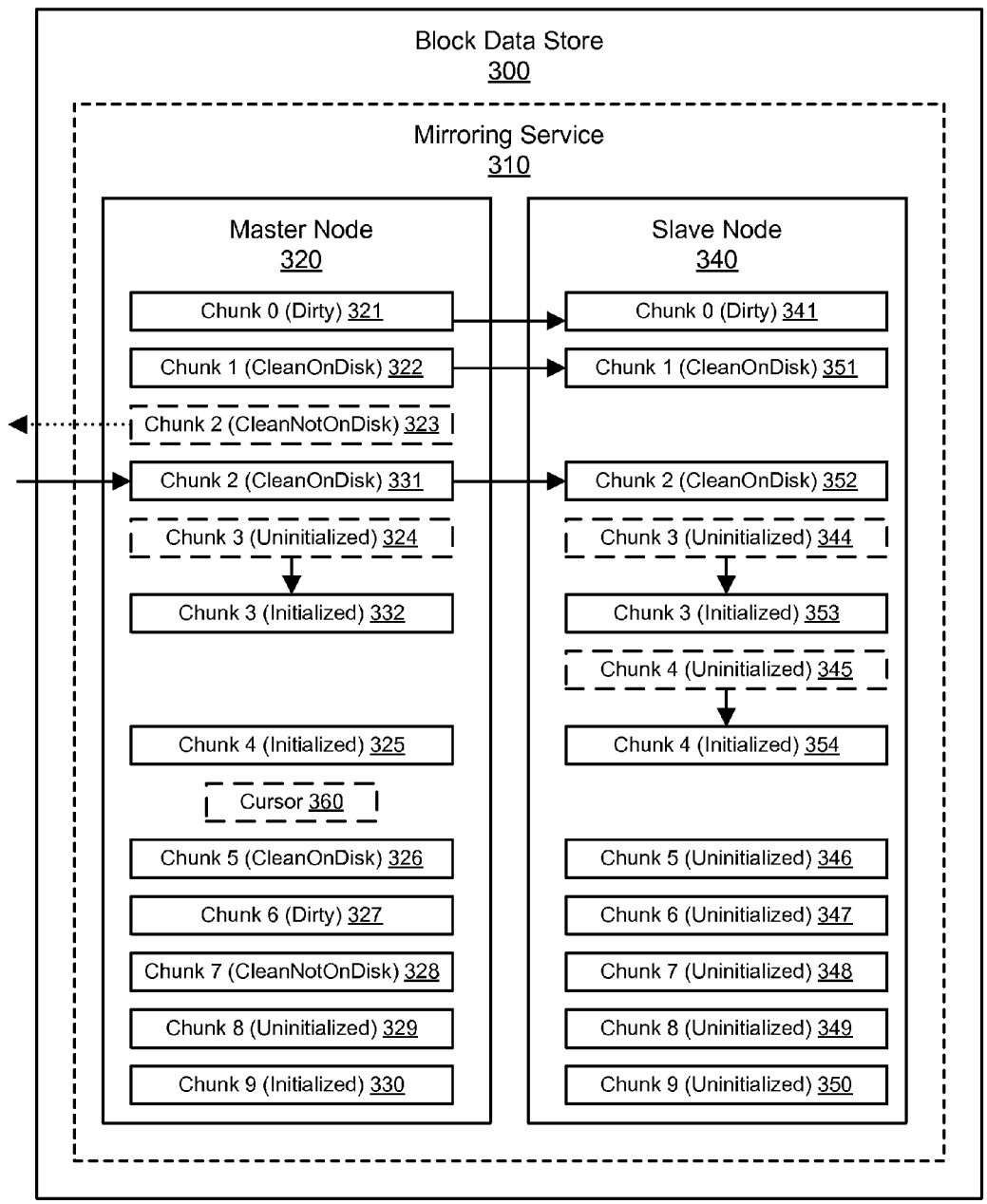
FIG. 9 illustrates an example of a block data store undergoing a fourth level of a cursor remirroring process, according to one embodiment.

FIG. 9 illustrates an example of a block data store undergoing a fourth level of a cursor remirroring process, according to one embodiment. In a fourth level of cursor remirroring, dirty chunks and all clean chunks (both on disk and not on disk) may be copied to the slave node; clean chunks not on disk may be retrieved from the external data store. Additionally, uninitialized chunks may be zeroed out (i.e., by being overwritten with zeroes) as they are encountered in the sequence. The fourth level of the mirroring process may again include visiting each of the plurality of chunks and placing a cursor after the last visited chunk. The chunks may be visited in a particular sequence. In various embodiments, the sequence may be determined in any suitable manner. In one embodiment, the sequence may be random. Accordingly, the sequence of the chunks shown in FIG. 9 may not represent the order in which the chunks are stored on disk. In one embodiment, the sequence may be based on an order in which the chunks are stored, e.g., in order from the first chunk to the last chunk on the master node. The cursor may be implemented as a placeholder or other metadata maintained by the mirroring service, such as a map of visited chunks, and may not represent any data stored between chunks on the master node 320. As shown in FIG. 9, the first five chunks have been processed by the mirroring process, and the cursor 360 is placed after chunk 325.

In the fourth level of cursor remirroring, the mirroring process may copy the chunk data (i.e., the actual contents of the chunk as stored on the master node) for any dirty chunk, such as by replicating the chunk data for the zeroth chunk 321 (dirty) on the master node 320 to the corresponding zeroth chunk 341 (dirty) on the slave node 340. In the fourth level of cursor remirroring, the mirroring process may also copy the chunk data for clean chunks that are stored locally on the master node 320. As shown in the example, the mirroring process may thus replicate the chunk metadata for the first chunk 322 (clean on disk) on the master node to the corresponding first chunk 351 (clean on disk) on the slave node. In the fourth level of cursor remirroring, the mirroring process may proactively obtain the chunk data for any clean chunk that is not stored locally on the master node 320, e.g., using the chunk metadata for the chunk. This operation may prevent the occurrence of get faults. The mirroring process may then replicate the chunk data to the slave node. Accordingly, the mirroring process may obtain the chunk data 331 for the second chunk 323 (clean not on disk) and replicate the chunk data 331 (clean on disk) from the master node to the corresponding second chunk 352 (clean on disk) on the slave node.

Prior to the mirroring process, the third chunk 324 is uninitialized on the master node, and the fourth chunk 325 is unused but initialized (e.g., it has been filled with zeroes) on the master node. In the fourth level of cursor remirroring, the remirroring process may initialize any uninitialized chunks, e.g., by zeroing them out. Accordingly, the uninitialized chunk 324 may be turned into an initialized chunk 332 on the master node. Similarly, the uninitialized chunks 344 and 345 may be turned into initialized chunks 353 and 354, respectively, on the slave node. This "zero touch" operation may prevent the occurrence of zero faults.

In the example shown in FIG. 9, five chunks are located below the cursor: a fifth chunk 326 (clean on disk), a sixth chunk 327 (dirty), a seventh chunk 328 (clean not on disk), an eighth chunk 329 (uninitialized), and a ninth chunk 330 (initialized). As the mirroring process visits each of these chunks, they will be processed in a similar manner as their counterparts above the cursor. Before these chunks are mirrored, their corresponding chunks on the slave node may remain uninitialized: the fifth chunk 346, the sixth chunk 347, the seventh chunk 348, the eighth chunk 349, and the ninth chunk 350. In the fourth level of cursor remirroring, write operations on the chunks below the cursor may be handled in a different manner than write operations on the chunks above the cursor.

Figure 10:
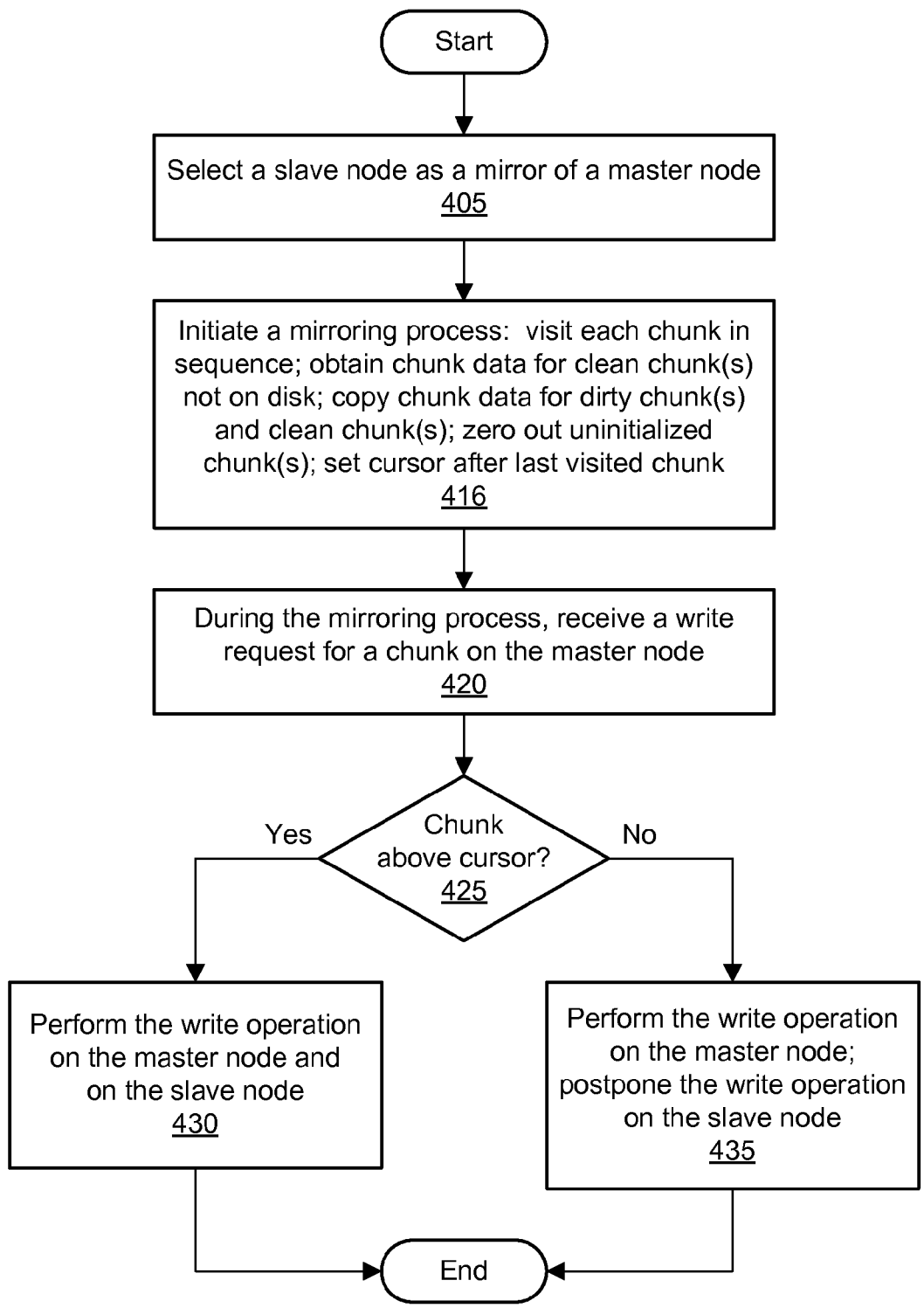
FIG. 10 is a flowchart illustrating a method for a fourth level of cursor remirroring, according to one embodiment.

FIG. 10 is a flowchart illustrating a method for cursor remirroring, according to one embodiment. In one embodiment, FIG. 10 illustrates a fourth level of cursor remirroring. As shown in 405, a slave node may be selected as a mirror of a master node. The slave node may be selected from a plurality of other nodes within the same cluster as the master node. The slave node may be selected based on any suitable criteria, such as the size of the available storage managed by the slave node.

As shown in 416, a mirroring process may be initiated for master node. The master node may store a plurality of chunks, including one or more dirty chunks and one or more clean chunks. Individual ones of the clean chunks may be stored locally by the master node or may be stored on an external data store which is linked to the master node by chunk metadata stored locally by the master node. The mirroring process may include visiting each of the plurality of chunks in a sequence, e.g., in order from the first chunk to the last chunk on the master node. At the fourth level of cursor remirroring, the mirroring process may include copying the chunk data to the slave node for each dirty chunk on the master node, obtaining the chunk data (i.e., from the external data store) for each clean chunk that is not stored locally on the master node, and copying the chunk data to the slave node for each clean chunk on the master node, and zeroing out each uninitialized chunk (i.e., by writing zeroes to the chunk) on the master node and/or slave node. The zeroing operation may prevent zero faults from occurring.

As shown in 420, during the initiated mirroring process, a request for a write operation may be received, e.g., from a client or customer. The request may seek to write data to one of the chunks stored by the master node. As shown in 425, the mirroring process may determine whether the chunk that is subject to the request is above or below the cursor. In other words, the mirroring process may determine whether the chunk that is subject to the request has been visited by the ongoing mirroring process.

As shown in 430, if the chunk in the request has been visited in the mirroring process, then the requested write operation may be performed on the master node and on the slave node. Performing the write operation on the slave node may include forwarding the write request to the slave node.

As shown in 435, if the chunk in the request has not been visited in the mirroring process, then the write operation is performed on the master node. The write operation or its effects on the slave node may be postponed. The write operation on the slave node may be postponed until chunk data for the requested chunk as been copied to the slave node in the mirroring process. When the cursor reaches the requested chunk, the chunk as modified by the write operation on the master node may be replicated to the slave node. Alternatively, when the cursor reaches the requested chunk, the unmodified chunk may be transferred to the slave node along with the write request, and the write request may be performed on the slave node. In this manner, a mirror fault may be avoided.

Illustrative Computer System

In at least some embodiments, a computer system that implements a portion or all of one or more of the technologies described herein may include a general-purpose computer system that includes or is configured to access one or more computer-readable media. FIG. 11 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
    one or more computing devices configured to implement a block data store comprising a plurality of nodes, wherein the plurality of nodes comprises a master node, and wherein the master node comprises a sequence of chunks representing volume data; and
    one or more computing devices configured to implement a mirroring service, wherein the mirroring service is operable to:
        select, from the plurality of nodes, a slave node;
        initiate a mirroring process from the master node to the slave node, wherein the mirroring process is operable to:
            for a set of one or more dirty chunks in the sequence, replicate chunk data from the master node to the slave node;
            for a set of one or more clean chunks in the sequence, replicate chunk metadata from the master node to the slave node;
            set a position of a cursor after a final replicated chunk of the sequence and before a first unreplicated chunk of the sequence;
        during the initiated mirroring process, receive a request for a write operation on one of the chunks on the master node;
        if the one of the chunks in the request is positioned before the cursor, perform the write operation on the master node and on the slave node; and
        if the one of the chunks in the request is positioned after the cursor, perform the write operation on the master node before the mirroring process reaches the one of the chunks in the request in the sequence and delay an effect of the write operation on the slave node until after the mirroring process reaches the one of the chunks in the request in the sequence, wherein the effect of the write operation on the slave node is delayed based at least in part on the one of the chunks in the request not having been reached in the mirroring process.

2. The system as recited in claim 1, wherein, before performing the write operation on the master node, the mirroring process is operable to obtain, from an external data store, chunk data for the one of the chunks in the request.

3. The system as recited in claim 1, wherein the mirroring process is operable to:
    write a plurality of zeroes to an uninitialized chunk on the master node and on the slave node.

4. The system as recited in claim 1, wherein the mirroring process is operable to:
    subdivide at least one of the chunks into a plurality of sub-chunks; and
    perform the mirroring process for a sequence comprising one or more of the sub-chunks.

5. A computer-implemented method, comprising:
    initiating a mirroring process for a plurality of chunks stored by a master node, wherein the plurality of chunks comprises one or more dirty chunks, and wherein the mirroring process comprises visiting a sequence of one or more of the plurality of chunks and, for a set of the dirty chunks in the sequence, copying chunk data to a slave node;
    during the initiated mirroring process, receiving a request for a write operation on one of the chunks stored by the master node;
    if the one of the chunks in the request has been visited in the mirroring process, performing the write operation on the master node and on the slave node; and
    if the one of the chunks in the request has not been visited in the mirroring process, performing the write operation on the master node before the one of the chunks in the request has been visited in the mirroring process and postponing an effect of the write operation on the slave node until the one of the chunks in the request has been visited in the mirroring process, wherein the effect of the write operation on the slave node is postponed based at least in part on the one of the chunks in the request not having been visited in the mirroring process.

6. The method as recited in claim 5, wherein the mirroring process comprises, for a set of one or more clean chunks of the master node, replicating chunk metadata from the master node to the slave node.

7. The method as recited in claim 5, wherein the mirroring process comprises:
    for a set of one or more clean chunks stored locally by the master node, replicating chunk data from the master node to the slave node; and
    for a set of one or more clean chunks not stored locally by the master node, replicating chunk metadata from the master node to the slave node.

8. The method as recited in claim 5, wherein the mirroring process comprises:
    for a set of one or more clean chunks stored locally by the master node, replicating chunk data from the master node to the slave node; and
    for a set of one or more clean chunks not stored locally by the master node, obtaining chunk data from an external data store and replicating the obtained chunk data from the master node to the slave node.

9. The method as recited in claim 8, wherein the mirroring process comprises:
    for a set of one or more uninitialized chunks of the master node, writing a plurality of zeroes to the chunk on the master node and on the slave node.

10. The method as recited in claim 5, wherein the mirroring process comprises:
    subdividing at least one of the chunks into a plurality of sub-chunks; and
    perform the mirroring process for a sequence comprising one or more of the sub-chunks.

11. A system, comprising:
    at least one processor;
    a storage cluster comprising a master node and a slave node; and
    a memory coupled to the at least one processor, wherein the memory stores program instructions, wherein the program instructions are executable by the at least one processor to:
        initiate a replication process for the master node, wherein the master node comprises a plurality of chunks comprising one or more dirty chunks, and wherein, in the replication process, the program instructions are executable by the at least one processor to proceed through a sequence of one or more of the plurality of chunks and, for a set of the dirty chunks in the sequence, replicate chunk data to the slave node;

receive a request for a write operation on one of the chunks;

if chunk data for the one of the chunks in the request has been replicated to the slave node in the replication process, perform the write operation on the master node and on the slave node; and if chunk data for the one of the chunks in the request has not been replicated to the slave node in the replication process, perform the write operation on the master node and delay the write operation on the slave node, wherein the write operation on the slave node is delayed based at least in part on the one of the chunks in the request not having been replicated to the slave node in the replication process.

12. The system as recited in claim 11, wherein, in the replication process, the program instructions are executable by the at least one processor to:

replicate chunk metadata from the master node to the slave node for a set of one or more clean chunks of the master node.

13. The system as recited in claim 11, wherein, in the replication process, the program instructions are executable by the at least one processor to:

replicate chunk data from the master node to the slave node for a set of one or more clean chunks stored locally by the master node; and replicate chunk metadata from the master node to the slave node for a set of one or more clean chunks not stored locally by the master node.

14. The system as recited in claim 11, wherein, in the replication process, the program instructions are executable by the at least one processor to:

replicate chunk data from the master node to the slave node for a set of one or more clean chunks stored locally by the master node; and obtain chunk data from an external data store and replicate the obtained chunk data from the master node to the slave node for a set of one or more clean chunks not stored locally by the master node.

15. The system as recited in claim 14, wherein, in the replication process, the program instructions are executable by the at least one processor to:

write a plurality of zeroes to the chunk on the master node and on the slave node for a set of one or more uninitialized chunks of the master node.

16. The system as recited in claim 11, wherein the program instructions are executable by the at least one processor to:

complete the replication process for the one of the chunks in the request, wherein the program instructions are executable by the at least one processor to copy chunk data modified by the write operation from the master node to the slave node.

17. A non-transitory, computer-readable storage medium storing program instructions computer-executable to perform:

initiating a mirroring process for a plurality of chunks stored by a master node, wherein the mirroring process comprises visiting a sequence of one or more of the chunks and, for at least a subset of the visited chunks, copying chunk data or metadata to a slave node;

during the initiated mirroring process, receiving a request for a write operation on one of the chunks of the master node;

if the one of the chunks in the request has been visited in the mirroring process, performing the write operation on the master node and on the slave node; and if the one of the chunks in the request has not been visited in the mirroring process, performing the write operation on the master node before the one of the chunks in the request has been visited in the mirroring process and postponing an effect of the write operation on the slave node until chunk data for the one of the chunks in the request is copied to the slave node in the mirroring process, wherein the effect of the write operation on the slave node is postponed based at least in part on the one of the chunks in the request not having been visited in the mirroring process.

18. The non-transitory, computer-readable storage medium as recited in claim 17, wherein the mirroring process comprises:

for a set of one or more dirty chunks of the master node, replicating chunk data from the master node to the slave node; and for a set of one or more clean chunks of the master node, replicating chunk metadata from the master node to the slave node.

19. The non-transitory, computer-readable storage medium as recited in claim 17, wherein the mirroring process comprises:

for a set of one or more dirty chunks of the master node, replicating chunk data from the master node to the slave node; and for a set of one or more clean chunks stored locally by the master node, replicating chunk data from the master node to the slave node; and for a set of one or more clean chunks not stored locally by the master node, replicating chunk metadata from the master node to the slave node.

20. The non-transitory, computer-readable storage medium as recited in claim 17, wherein the mirroring process comprises:

for a set of one or more dirty chunks of the master node, replicating chunk data from the master node to the slave node; and for a set of one or more clean chunks stored locally by the master node, replicating chunk data from the master node to the slave node; and for a set of one or more clean chunks not stored locally by the master node, obtaining chunk data from an external data store and replicating the obtained chunk data from the master node to the slave node.

21. The non-transitory, computer-readable storage medium as recited in claim 20, wherein the mirroring process comprises:

for a set of one or more uninitialized chunks of the master node, writing a plurality of zeroes to the chunk on the master node and on the slave node.

* * * * *